United States Patent [19]

Gautier

[11] 4,070,669
[45] Jan. 24, 1978

[54] ANTI-FRAUD ALARM TRANSMISSION LINE SECURITY SYSTEM

[76] Inventor: Gerard A. Gautier, 27, Rue Gustave Robin, Chatenay-Malabry, France, 92290

[21] Appl. No.: 718,168

[22] Filed: Aug. 27, 1976

[30] Foreign Application Priority Data

Sept. 15, 1975 France .................................. 75 28205

[51] Int. Cl.² ............................................ G08B 19/00
[52] U.S. Cl. ..................................... 340/409; 340/416
[58] Field of Search .................... 340/213 R, 216, 288, 340/310 R, 312, 409, 411, 416; 179/5 R

[56] References Cited
U.S. PATENT DOCUMENTS

| 3,307,176 | 2/1967 | Sadler | 340/411 |
| 3,934,237 | 1/1976 | Gysell et al. | 340/213 R |

Primary Examiner—Alvin H. Waring

[57] ABSTRACT

A transmitter transmits a continuous "non-alarm" signal to a monitoring center. When an alarm occurs, e.g. if a burglary takes place, the "non-alarm" signal ceases, and an alarm is indicated at the monitoring center. To prevent the "non-alarm" signal being pre-recorded and subsequently being relayed to the monitoring center to render the transmitter ineffective, the monitoring center transmits random trap pulses having a carrier frequency different from the "non-alarm" signal. If the monitoring center detects a trap pulse at any time other than when transmitting such a pulse, an alarm is indicated.

1 Claim, 1 Drawing Figure

ANTI-FRAUD ALARM TRANSMISSION LINE SECURITY SYSTEM

BACKGROUND OF THE INVENTION

1. Field of the Invention

This invention relates to security systems and particularly to an anti-fraud alarm transmitting system from a protected area or monitored station to a central monitor via a communication line. This line may either be a special-purpose two-wire line, i.e. a line permanently connected to transmitting and receiving devices at both ends, or a subscriber's line to a telephone network.

2. Description of the Prior Art

It has been proposed to use telephone connections for transmitting an alarm signal, the signal being given by cutting off at least one "non-alarm" component at a preset frequency permanently transmitted by the alarm transmitting device from one station to a monitoring center comprising means for receiving the "non-alarm" component, and adapted to give an indication of alarm conditions, when the "non-alarm" component is not received. For example, such a system may be used on a burglar alarm system, and when an intruder is detected a transmitting station will cease transmitting the "non-alarm" signal. Staff at the monitoring center will note the resultant indication of alarm conditions and may notify security personnel or the Police, as is appropriate.

A known device of the aforementioned kind uses one or more frequencies which are in the telephone band from 300 to 3400 Hz, or outside the band in the case of a telephone connection including a subscriber's line to a telephone network. However, the known device can be effectively put out of action in fraudulent manner, e.g. by using an ordinary tape-recorder to record the transmitted "non-alarm" frequencies and retransmit them from the tape recorder to the monitoring center after disconnecting the original alarm transmitting device.

Another prior art alarm line security system includes a plurality of alarm sources which include intrusion detectors located in areas to be protected, each of which detectors provides an alarm indication responsive to the detection of an unauthorized entry of one of the protected areas. Each alarm source is connected to a separate alarm source monitoring circuit which includes a code generator which generates a selected sequence of code bits for transmission to alarm line monitoring circuits at a central monitoring location. The coded sequence of bits from each alarm source monitoring circuit are multiplexed for transmission to the central monitoring location over a single pair of transmission alarm lines.

Furthermore, each alarm source includes an associated alarm source monitoring circuit having a code generator and means responsive to the detection of an unauthorized entry, to modify code bits output by the code generator to indicate an alarm. The alarm line monitoring circuits at the central monitoring area also include a reference code generator which generates a sequence of code bits which is identical to that provided by the code generators associated with each alarm source.

The alarm line monitoring circuit also includes a code comparator circuit which accepts the coded bits transmitted to the central monitoring area over the alarm line from each alarm source and compares such bits with the reference code bits generated by the reference code generator at the central monitoring location. Under normal conditions (i.e., when all protected areas are secure), the sequence of bits received from the remote alarm sources will be identical with the sequence of bits provided by the reference code generator. However, whenever an alarm indication is provided by one or more of the alarm sources, the code transmitted from such sources will differ from the reference code. With the detection of a difference in one or more bits by the code comparator circuit, an alarm output signal is provided to enable an alarm to be registered at the central monitoring area.

In this last mentioned alarm transmission line security system, pseudo-random code generators are to be provided in all the protected areas and in the central monitor and the alarm signals are multi-bit code words which can take two forms according to whether the protected area is in the normal condition or in the alarm condition. Accordingly, the monitored stations comprise circuitry which is as complicated as in the central monitor and the difficulty of maintenance in these monitored stations along with the circuitry initial cost dictate against the use of such systems.

SUMMARY OF THE INVENTION

It is an object of the present invention to provide a simple, inexpensive and anti-fraud alarm line security system of the non-alarm AC signal type which is protected against persons who are attempting to defeat the system by recording the signal conveyed by the alarm transmitting line and re-transmitting fraudulently the same towards the central monitor after disconnection of the monitored station.

It is another object of the invention to provide an alarm transmission line security system which can be simply added to existing non-alarm alternating signal systems already in operation without modifying the circuitry in the monitored stations.

The invention provides an anti-fraud alarm transmission line security system in which the monitored stations transmit non-alarm alternating signals at a non-alarm frequency and the central monitor comprises means for sensing the cessation of said non-alarm signals, means for transmitting a pseudo-random sequence of pulses at a "trap" frequency along the line, the trap frequency being different from the non-alarm frequency, and additional receiving means adapted to give an indication of alarm conditions if the "trap" frequency is present in the signal received by the central monitor during a time interval in which it has not been transmitted.

It is to be noticed that a pseudo-random code generator is only needed at the monitoring center and that the multi-bit pseudo-random code words do not convey alarm information. They are mixed to the non-alarm alternating signal for preventing a defrauder from recording the line signal then re-transmitting this previously recorded line signal. In such a case, the pseudo-random pulse sequence retransmitted by the defrauder will not be cophasal with the pulse sequence transmitted at the same time by the central monitor and as the receiver thereof is brought to inhibition by the transmitted sequence, it will be activated by the re-transmitted sequence.

The proposed alarm system is considerably more efficient than the non-alarm alternating signal system, since it can be neutralized only by recording the line signal including the non-alarm frequency and the trap frequency without cutting the line, by subsequently analyzing the recorded frequencies, by erasing the trap frequency from the recording and only re-transmitting the non-alarm frequency. This method, however, takes considerable time and requires relatively extensive technical apparatus.

Other objects and advantages of the invention will become apparent from the following detailed description of the invention which makes reference to the accompanying drawing.

BRIEF DESCRIPTION OF THE DRAWING

The single accompanying drawing is a schematic representation of a complete alarm transmission line security system according to the invention.

DESCRIPTION OF A PREFERRED EMBODIMENT

Figure 1:
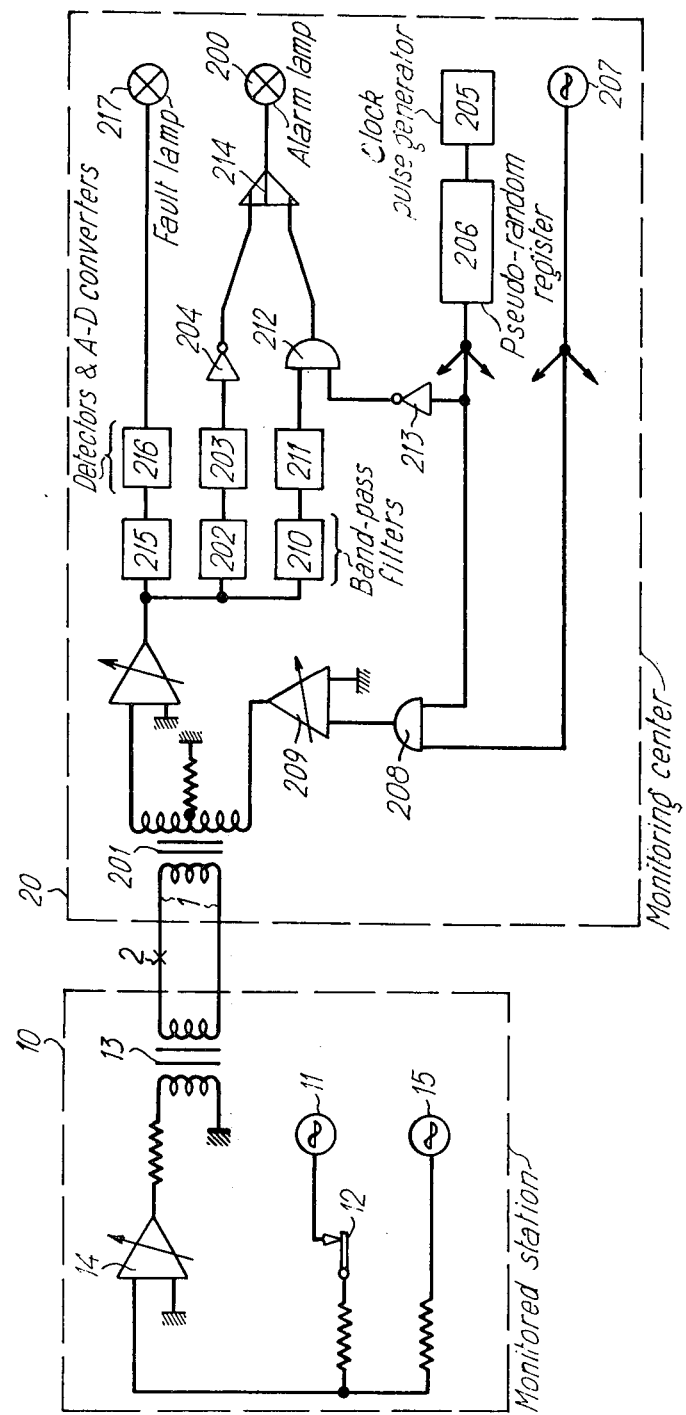

Referring to the drawing, the alarm system comprises a plurality of monitored stations such as 10, each including an alarm source, and a central monitor 20. Each monitored station is connected to the central monitor by a transmission line 1. In one application of the invention to an unauthorized entry detection system, the alarm sources are intrusion detector means, such as an entry switch 12 for indicating an unauthorized entry into the protected area. This entry switch 12 has a normally closed contact. Under normal conditions a non-alarm signal of frequency $F_1$ produced by sine generator 11 is permanently transmitted to the central monitor through closed contact 12, operational amplifier 14, transformer 13 and line 1. In the event of an alarm in monitored station 10, alarm switch contact 12 opens and transmission of the non-alarm signal is stopped.

In the monitoring center 20, the non-alarm signal appears at the receive output of a line differential amplifier 201 and is then applied to a pass-band filter 202 tuned to frequency $F_1$, a detector and analog-to-digital converter 203, an inverter 204 and an alarm device 200. Detector and A-D converter 203 converts the presence or absence of the non-alarm signal at frequency $F_1$ to a logic level output signal which for example may indicate an alarm condition as a logic O level and the absence of an alarm as a logic 1 level. The output digit of circuit 203 is inverted in inverter 204 and alarm device 200 is thus triggered if the frequency $F_1$ is absent. Up to now, the system is entirely a prior art system.

According to the invention, the aforementioned system is supplemented as follows at the monitoring center in order to prevent tampering at any point 2 on line 1 so as to put the system out of action by recording in a tape-recorder the signal at the non-alarm frequency $F_1$ then disconnecting the monitored station and transmitting to the monitoring center the signal of frequency $F_1$ by means of the tape-recorder.

A clock 205, e.g. a simple astable multivibrator, actuates a known pseudo-random code generator 206 so that a trap signal of frequency $F_2$ from a sine generator 207 is modulated by a psuedo-random pulse sequence and is applied to line 1 through an analog gate 208 (e.g. a field-effect transistor) followed by an operational amplifier 209. As is well known, a pseudo-random code generator circuit consists of a N stage shift register having feedback connections from selected stages respectively connected through an exclusive OR-gate to the input of the first stage. The exclusive OR-gate provides a logic O output whenever the two inputs to the gate are the same logic level and provides a logic 1 output whenever the inputs are different logic levels. The pseudo-random sequence is formed of $2^N-1$ words of N bits. As the total number of combinations of N bits is $2^N$, one combination is missing; it is the "all zeros" combination.

The signal received from line 1 at the monitoring center travels through a band-pass filter 210 tuned to frequency $F_2$ and then after being processed by a detector and analog-to-digital converter 211, is applied to a first input of an AND-gate 212 whose second input is connected to the output of register 206 via an inverter 213. The output signals of the previously-mentioned inverter 204 and AND-gate 212 are applied to the inputs of an OR-gate 214 whose output is connected to the previously-mentioned alarm device 200.

The alarm system operates as follows:

During normal operation, pseudo-random pulses at carrier frequency $F_2$ are sent along the line 1 by the monitoring center 20 through the transmit winding and the line winding of differential transformer 201. This differential transformer is deliberately not perfectly balanced. Thus due to coupling between the transmit and receive windings, the pseudo-random pulses are returned to the monitoring center as soon as they are transmitted. There is not practically any phase shift between the transmitted and the received pulses. However, the trap signal does not trigger the alarm device 200 since AND-gate 212 is inhibited to the received pulses by the transmitted pulses inverted in inverter 213.

If a fraudulent operator attempts to record and re-transmit the signal in line 1 after disconnecting the monitored station, it is practically impossible for him to re-transmit the pick-up sequence so as to make the pulse sequence to coincide with the pulse sequence simultaneously transmitted by the center. Consequently, the inevitable result of tampering is that the "one" or "zero" pulses at carrier frequency $F_2$ are present in the received signal during periods in which the transmitted trap frequency pulses are "zero" or "one" pulses, thus triggering an alarm.

Conventionally, use is made of another signal component at a frequency $F_O$ or "line monitoring frequency", so that the center can check whether the line is continuous or not. For this reason, the diagram further includes a generator 15 of frequency $F_O$ in the monitored station 10, this generator being connected in parallel to the aforementioned assembly 11, 12 and, in the monitoring center, a band-pass filter 215 tuned to frequency $F_O$, a detector and analog-to-digital converter 216 and a fault-indicating device 217 connected at the monitoring center in parallel with the previously-mentioned paths 202 to 200 and 210 to 200.

What I claim is:

1. In a transmission line security system including a transmission line for carrying alarm information from at least one monitored station to a central monitor station, said alarm information being in the form of a non-alarm signal having a first frequency, permanently transmitted along said line under normal conditions and cut-off under alarm conditions; that improvement consisting of:
    means at said central monitor station for generating and transmitting to at least one of said monitored station a trap signal having a second frequency which is different from said first frequency and which is modulated in pseudo-random pulses;
    means for picking up and receiving said transmitted trap signal;

means for triggering an alarm by said received trap signal;
means for inhibiting said trap signal receiving means by said transmitted trap signal;
said means for inhibiting said trap signal receiving means by said transmitted trap signal including means for inverting said trap signal; and,
an "AND gate" for receiving on a first input said inverted trap signal and on a second input said received trap signal.

* * * * *